United States Patent [19]

Oki et al.

[11] 4,355,254

[45] Oct. 19, 1982

[54] BRUSH HOLDING DEVICE FOR ELECTRIC ROTARY MACHINE

[75] Inventors: Norihiro Oki, Katsuta; Shoji Motegi, Hitachi; Yasuyuki Wachi, Takahagi; Yoshio Takikawa, Hitachi; Norio Yamakawa, Ibaraki, all of Japan

[73] Assignees: Hitachi, Ltd.; Hitachi Chemical Co., Ltd., both of Tokyo, Japan

[21] Appl. No.: 204,047

[22] Filed: Nov. 4, 1980

[30] Foreign Application Priority Data

Nov. 9, 1979 [JP] Japan ............................... 54-145703

[51] Int. Cl.³ ............................................. H02K 13/00

[52] U.S. Cl. .................................... 310/242; 310/239; 310/246

[58] Field of Search ............... 310/239, 245, 246, 240, 310/241, 242, 243, 244, 247

[56] References Cited

U.S. PATENT DOCUMENTS

| | | | |
|---|---|---|---|
| 2,840,734 | 6/1958 | Nottleman et al. | 310/246 |
| 3,387,155 | 6/1968 | Krulls | 310/245 |
| 3,423,618 | 1/1969 | Schmid et al. | 310/246 |
| 3,445,705 | 5/1969 | Fuller et al. | 310/247 |

FOREIGN PATENT DOCUMENTS

| | | | |
|---|---|---|---|
| 263129 | 7/1968 | Australia | 310/239 |
| 638216 | 3/1962 | Canada | 310/239 |
| 1197972 | 8/1965 | Fed. Rep. of Germany | 310/246 |
| 54-4301 | 1/1979 | Japan | 310/239 |

*Primary Examiner*—A. T. Grimley

*Assistant Examiner*—D. L. Rebsch

*Attorney, Agent, or Firm*—Antonelli, Terry & Wands

[57] ABSTRACT

A brush holding device for an electric rotary machine for holding a brush electrically connecting the stationary part of the electric rotary machine to a rotating slip ring, the device comprising a brush box supported on the stationary part to accommodate the brush therein, a main wall detachably mounted on a main post extending from the brush box, a brush retaining element in the form of a band for retaining the brush in the brush box, a handle for carrying the main wall together with the brush, and a manipulating lever for unlockably locking the main wall to the brush box, whereby the brush can be easily and simply replaced.

7 Claims, 8 Drawing Figures

BRUSH HOLDING DEVICE FOR ELECTRIC ROTARY MACHINE

This invention relates to a brush holding device for an electric rotary machine, and more particularly to improvements in a brush holding device which is constructed to permit easy replacement of a brush even when the electric rotary machine is in operation.

In an electric rotary machine such as, for example, an electric generator driven by a steam turbine or a water turbine, excitation power is generally supplied from the stator part of the generator to the rotor winding of a rotating rotor part. Since, in this case, the rotor is rotating relative to the stator, it is impossible to supply the excitation power from the stator part to the rotor winding by merely mechanically connecting a lead wire conductor therebetween. It is therefore a very common practice to employ an arrangement in which a slip ring, made of an electrical conductive material, is mounted on the rotor part, that is, on a portion of the rotor, and brushes, made of a material such as, for example carbon or a metal softer than the material of the slip ring, are disposed on the stator part, so that the rotor part can be electrically connected to the stator part by the sliding contact between the slip ring and the brushes.

In the above arrangement, a brush holder is commonly employed as a means for securely holding a brush on the stator part. This brush holder is provided with a pressure imparting means such as a spring so as not only to prevent dropping of the brush but also to prevent lateral displacement of the brush and to urge the brush into sufficient pressure contact with the slip ring at a predetermined pressure.

This brush holder must be sufficiently securely supported on the stator part so that vibration of the electric rotary machine, impingement of cooling gas flowing at a high speed around the brush holder, etc. may not cause an undesirable free-vibration of the brush holder. To avoid this undesirable free-vibration, the brush holder is customarily bolted to a stationary part or integrally formed with the stationary part so as to be securely fixed thereto.

With the brush holder constructed and securely supported in the manner described above, when the brush held therein is worn out or cracked, the worn-out or cracked brush only is removed from within the brush holder while leaving the brush holder in the state securely supported on the stationary part. During removal of the faulty brush from the brush holder (or similarly, during installation of a new brush into the brush holder), the operation of the electric rotary machine is temporarily stopped for safety considerations of the operator, since the brush and the brush holder are conductive members of the current conduction part. That is, the electric rotary machine is temporarily shut down for the replacement of the brush.

In the case of a drive motor used to drive a machine tool, an industrial machine or the like, a brush of the drive motor can be easily replaced by stopping the operation of the motor as required or during shutdown of the motor. However, in the case of a dynamoelectric machine such as a steam turbine generator or a water turbine generator for supplying commercial power requirements, stopping the operation of the dynamoelectric machine of large capacity, whenever replacement of a brush is required, results not only in very great industrial losses but also in inconveniences of power receiving parties. Therefore, such a dynamoelectric machine must not be frequently shut down.

To meet such a demand, various devices for permitting replacement of a brush without the necessity for shutdown of such an electric rotary machine have recently been proposed, and some of them have been put into practical use.

Removal of a defective brush only (or installation of a new brush) as a means for replacing the brush without stopping the operation of the electric rotary machine is difficult in view of the fact that the pressure imparting means (which is commonly in the form of a spring) pressing the brush toward the slip ring is disposed on the head side of the brush, that is, on the brush removing side. Therefore, most of the prior art devices are so constructed as to remove the brush together with the brush holder holding the brush therein.

For the purpose of removal of the brush in the state held within the brush holder, an insulated handle has been previously mounted on the top portion of the brush holder. The provision of such a handle is advantageous in that the necessity for access of the operator's hand to the line part, as compared with the removal of the brush itself directly by the hand of the operator, is illuminated thereby improving the safety for the operator and also facilitating carrying of the brush holder. On the other hand, however, the detachable arrangement of the brush holder tends to give rise to a difficulty of securely supporting the brush holder in position. As described hereinbefore, the brush holder itself must be sufficiently securely supported vibration-free on a stationary part, since, if the brush holder itself were subjected to free-vibration, the brush held therein would also be subjected to free-vibration resulting in a chattering or an undesirable reduction of the current conducting capability. Although the brush holder can of course be easily securely supported by being bolted to or formed integrally with the stationary part if the detachable construction thereof is left out of consideration, it is a matter of extreme difficulty to securely support the brush holder vibration-free and yet to permit easy detachment of the brush holder from its mounted position.

Thus, various difficult problems must be solved for attaining replacement of the brush during operation of the electric rotary machine. A device which satisfies the aforementioned conditions to a considerable extent is known and is presently in practical use.

Such a device is disclosed in Japanese Patent Application Laid-Open No. 50-114514, wherein a brush holder itself is fixedly secured to a bus ring in the stator part of an electric rotary machine, and a spring for imparting pressure to a brush is separately provided from the brush holder and provided with a supporting member for supporting the spring, a locking member for locking the supporting member to the brush holder and an insulated handle so that these members may be removed and installed together with the brush. Because of such a construction, the brush holder can be securely supported on the stator part as by bolting or it can be integrally fabricated with the bus ring in the stator part, so that the brush holder may not be subjected to undesirable free-vibration.

However, due to the fact that the pressure imparting spring is imparting pressure to the brush even when the brush is to be replaced or especially when a new brush is to be installed in the electric rotary machine together with the spring, it has been difficult to support the brush during carrying thereof, and, therefore, replacement of the brush has not been so easy.

With a view to obviate the prior art difficulty pointed out above, it is a primary object of the present invention to provide an improved brush holding device of the kind comprising a brush holder secured to the stator part of an electric rotary machine and a spring provided separately from the brush holder so that a brush can be removed and installed together with the spring, in which the brush can be sufficiently tightly held within a brush carrier during carrying of the brush, and yet, it can be easily removed from and installed in the predetermined position in the electric rotary machine.

In accordance with the present invention a brush holding device for an electric rotary machine is provided which comprises a brush disposed is a to make sliding contact with a peripheral surface of a slip ring, and a brush holder releasably holding the brush while pressing the brush against the peripheral surface of the slip ring at a predetermined pressure, so that the brush can be removed or installed during operation of the electric rotary machine. The brush holder comprises a brush holding mechanism and a brush replacement unit. The brush holding mechanism is secured to a stationary part of the electric rotary machine and comprises a brush box for accommodating the brush therein, a main post extending from a portion of the brush box, and first engaging means formed on a portion of the main post. The brush replacement unit is adapted to be mounted on or detached from the brush holding mechanism together with the brush and comprises a main wall, a brush spring for imparting pressure to the brush, an insulated handle adapted to be grasped by the hand of an operator who carries the brush replacement unit, second engaging means engageable with the first engaging means when the replacement unit is mounted on the brush holding mechanism, means for causing engagement or disengagement of the second engaging means with or from the first engaging means, brush locking means for engaging with the brush and locking it in position when the brush replacement unit is carried, and brush retaining means fixed to a portion of the main wall for embracing a body portion of the brush.

The novel features believed characteristic of this invention are set forth in the appended claims. The invention itself, however, as well as other objects, feature and advantages thereof, may best be understood by reference to the following detailed description when read in conjunction with the accompanying drawings, in which:

A preferred embodiment of the brush holding device according to the present invention will now be described in detail with reference to the accompanying drawings.

Figure 1:
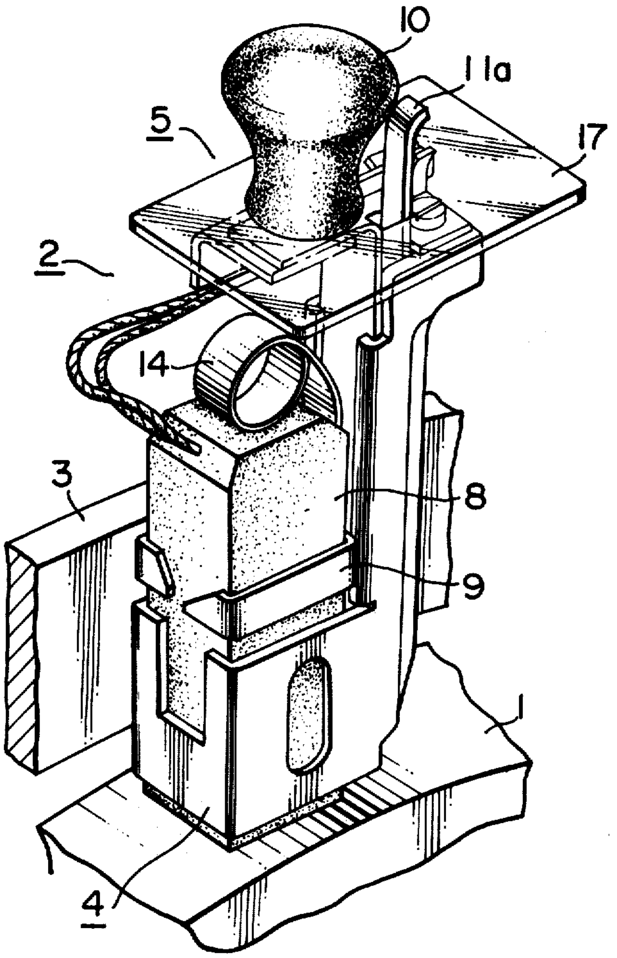
FIG. 1 is a perspective view showing an embodiment of the brush holding device according to the present invention.
Figure 2:
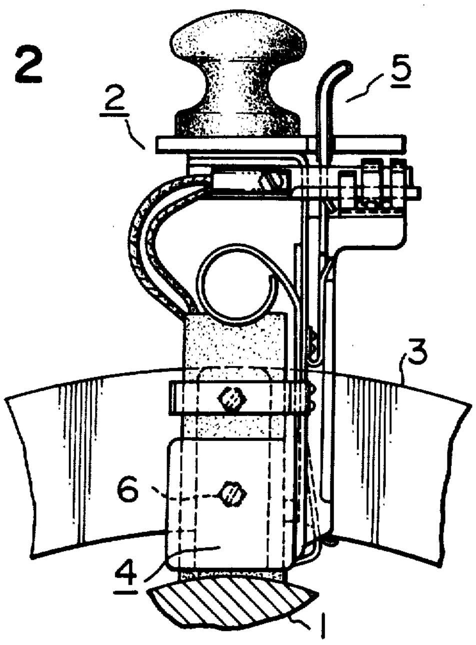
FIG. 2 is a side elevation view of the brush holding device shown in FIG. 1.

Referring to FIGS. 1 and 2, a current collector part of an electric rotary machine includes a slip ring 1 adapted for rotation together with a rotor shaft (not shown) and a brush holder 2 and a bus ring 3 both stationarily disposed adjacent to the periphery of the slip ring 1.

The slip ring 1 is made of an electrical conductive material and is electrically connected to the rotor winding by a lead disposed within a hollow space of the rotor shaft (not shown).

The brush holder 2, disposed in the stator part, is electrically connected to an exciter (not shown) through the bus ring 3. The brush holder 2 acts to electrically connect the rotor winding and the exciter, and it performs such a function especially between the rotating slip ring 1 and the stationary bus ring 3 in the stator part.

The brush holder 2 is broadly composed of a brush holding mechanism 4 and a brush replacement unit 5. The brush holding mechanism 4 is securely fixed by a bolt 6 to the stationary bus ring 3 in the stator part, while the brush replacement unit 5 is arranged to be detached or withdrawn from the brush holding mechanism 4 if necessary. The brush replacement unit 5 and the brush holding mechanism 4 in the detached state relative to each other are individually shown in FIGS. 3 and 6 respectively.

Figure 3:
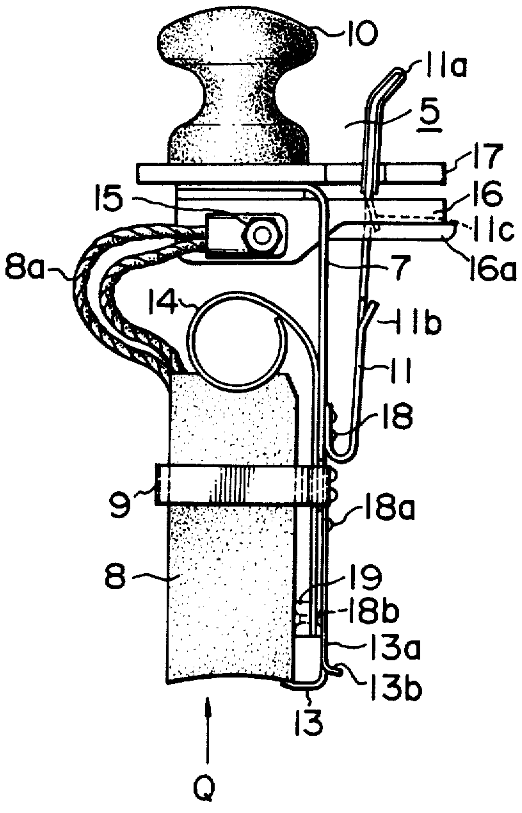
FIG. 3 is a side elevation view of the brush replacement unit in the device according to the present invention.

The structure of the brush replacement unit 5 will be first described with reference to FIGS. 3 to 5. Referring to FIG. 3, the brush replacement unit 5 comprises a main wall 7, a brush 8 having a pig tail 8*a*, a brush retaining element 9 embracing a body portion of the brush 8, a handle 10, adapted to be grasped by the hand of an operator who carries the brush replacement unit 5 itself and carries out detaching and mounting manipulation, a generally U-shaped latching member 11 for detachably locking the brush replacement unit 5 to the brush holding mechanism 4, a brush locking element 13 for supporting or locking the brush 8 in a lifted position in the brush replacement unit 5, and a coil spring 14 for urging the brush 8 toward the slip ring 1 at a predetermined pressure which is generally about 150 gm/cm$^2$. The coil spring 14 is anchored to a lower portion of the main wall 7 at one end of the coiled turns and is free at the other end portion thereof. This free end portion rests on the top surface of the brush 8 when the brush 8 is accommodated in position.

A threaded hole is provided in an upper portion of the main wall 7, and a machine screw 15 is screwed into this threaded hole to fix the terminals ofthe pig tail 8*a* of the brush 8 to the main wall 7. A current conductive knife 16 is mounted on this portion of the main wall 7 to extend in a rearward direction to the main wall 7. The current conductive knife 16 is made of an electrical conductive material and is electrically connected to the pig tail 8*a* of the brush 8. This knife 16 is formed with a projecting portion 16*a* of narrow width at its free end. The aforementioned handle 10 is also mounted on the top portion of the main wall 7. More precisely, the handle 10 extends upward from the top portion of the main wall 7 and is securely fixed to that portion of the main wall 7. A protective plate 17 made of an electrically insulating material is provided between the top portion of the main wall 7 and the handle 10 so as to protect the operator against an electric shock. It is needless to mention that the handle 10 is also made of an electrically insulating material. A square opening 17*a* is provided in a portion of the protective insulating plate 17 as shown in FIG. 4, and a manipulating lever 11*a* of the U-shaped latching member 11 extends through this opening 17*a* of the plate 17. This manipulating lever 11*a* has an electrically insulating protective coating on its surface. A locking mark 17*b* is provided on the upper surface of the plate 17 to be used as a means for confirming the state of locking of the brush replacement unit 5, described later, to the brush holding mechanism 4, and an arrow 17*c* indicating the direction of movement of the manipulating lever 11*a* for unlocking the brush replacement unit 5 from the brush holding mechanism 4 is also provided on the same upper surface of the plate 17, as shown in FIG. 4.

It is effective to make the protective insulating plate 17 from a transparent electrical insulator so that the degree of wear of the brush 8 as well as the operating state of the brush 8 can be easily externally inspected. However, this plate 17 need not be especially made of the electrical insulator in its entirety, and the plate 17 may be provided by applying an electrically insulating coating on the surface of, for example, metal plate. The same applies to the handle 10. The protective insulating plate 17 has preferably a largest possible size or surface area so as to protect the operator from the electrical and mechanical aspects, and its size and shape are selected taking also the ease of brush replacement into account. In the form shown in FIG. 5, the protective insulating plate 17 is rectangular in shape. This is because this specific shape is advantageous for protecting the operator against an electrical shock in that the space between the adjacent brush holding mechanisms can be fully covered with the protective insulating plate 17 when the plate 17 is mounted in position on the electric rotary machine.

The brush retaining element 9 is in the form of a loop of a strap or band extending from an intermediate portion of the main wall 7 and is so shaped as to permit easy insertion of the brush 8 therein. Although this retaining element 9 may be in the form of a sleeve of square cross section, a substantially V-shaped cutout 9*b* tapering upward toward the top of the brush 8 is preferably formed in the band portion 9*a* remote from the main wall 7, as best shown in FIG. 5, so that, with the gradual shortening of the length of the brush 8 due to wear, the pig tail 8*a* of the brush 8 can freely pass through this cutout 9*b* without engaging with the retaining element 9. Preferably, the dimension $W_1$ of the narrowest width of the cutout 9*b* is selected to have a relation $W_1<W_2$ between it and the dimension $W_2$ of the width of the coil spring 14, so that, even when the brush 8 is shortened until the coil spring 14 moves down to a point, in the vicinity of the retaining element 9, the associated portion of the spring 14 is prevented from jumping out over that portion of the retaining element 9. The above arrangement facilitates replacement of the brush 8 in the brush replacement unit 5.

The U-shaped latching member 11 is made of a resilient material and is fixed at one end thereof to the rear surface of the main wall 7, that is, the surface remote from the surface opposite to the brush 8, by pins 18 in a position aove the brush retaining element 9. The other end portion of the member 11 protrudes from the opening 17*a* of the protective insulating plate 17 to provide the manipulating lever 11*a*. Two spaced fingers 11*b* and 11*c* are provided on an intermediate portion of one of the arms of the member 11 terminating in the manipulating lever 11*a*. The lower finger 11*b* located nearer to the slip ring 1 than the upper finger 11*c* is tapered in such a manner that the distance between it and the main wall 7 increases in a direction away from the slip ring 1 or toward the plate 17 in FIG. 3. The upper finger 11*c*, further from the slip ring 1 than the finger 11*b*, has an extending direction opposite to that of the finger 11*b* and is spaced by a predetermined distance from the finger 11*b* so as to facilitate latching of the brush replacement unit 5 to the brush holding mechanism 4 described later. The latching member 11 is adapted to resiliently fit in a guide groove 21*c* formed in a main post 21 in the brush holding mechanism 4 described later with reference to FIG. 6, and its finger 11*b* engages with an aperture 21*a* (FIG. 6) of the main post 21 in the brush holding mechanism 4 thereby acting to mechanically hold the brush replacement unit 5 on the brush holding mechanism 4.

A brush locking element 13 extends along the lower portion of the main wall 7 or is disposed nearer to the slip ring 1 than the latching member 11. This brush locking element 13 includes a rocking plate 13*a* which is fixed to the main wall 7 by rivets 18*a* so as to support the bottom portion of the brush 8 with its lower portion end. More precisely, this rocking plate 13*a* is disposed along the lower portion of the main wall 7 and its lower end portion is freely rockable because of the spring action. Especially, the tip portion of the lower end of the rocking plate 13*a* is bent in the form of an L toward a brush box 20 (FIG. 6) of the brush holding mechanism 4, and the portion of the rocking plate 13*a* including the bent end portion is adapted to be inserted into a cutout 20*a* formed in one of the walls of the brush box 20 in the brush holding mechanism 4. Further, this rocking plate 13*a* is provided with an engaging portion or finger 13*b* which extends in a direction opposite to the extending direction of the portion bent in the form of L and is tapered in such a manner that the distance between it and the main wall 7 increases toward the slip ring 1. Although this brush locking element 13 is described to be rockable by its spring action for the purpose of explanation, the brush locking element 13 employed in the embodiment is not simply freely rockable, but it is so arranged that the L-shaped end portion of the rocking plate 13*a* is normally biased toward the brush box 20.

A block 10 of square cross section is mounted by a pin 18*b* on the surface of the main wall 7 adjacent to the lower end of the latter and on the disposed side of the coil spring 14. This block 19 cooperates with the brush locking element 13 to maintain the axis of the brush 8 in alignment with the direction of the downward pressure imparted by the coil spring 14 and cooperates also with the brush retaining element 9 to maintain the brush 8 in the above-mentioned position, so that the brush 8 can be stably held in the brush replacement unit 5.

The operator who grasps the handle 10 of the brush replacement unit 5 having the above structure can thus freely carry the unit 5 with the brush 8 stably held in the unit 5. The manner of handling and operation of the unit 5 will be described later.

Next, the structure of the brush holding mechanism 4 detachably supporting the brush replacement unit 5 in the position shown in FIG. 1 will be described with reference to FIG. 6.

Figure 6:
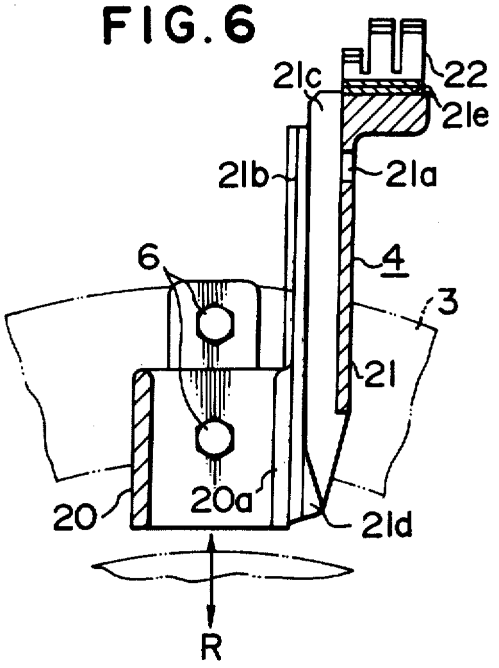
FIG. 6 is a side elevation view of the brush holding mechanism in the device according to the present invention.

Referring to FIG. 6, the brush holding mechanism 4 comprises, in a broad aspect, a brush box 20 fixed to the bus ring 3 by bolts 6, a main post 21 extending or upstanding from a portion of the brush box 20, and a current conductive member or socket 22 mounted on the top of the main post 21. The brush box 20 is in the form of a follow member of square cross section which is so sized that a brush 8 can freely move therein in the longitudinal direction or direction shown by the arrow R in FIG. 6 and cannot move in the lateral direction. A longitudinal cutout 20*a* is formed in one of the four sides or walls of the brush box 20, that is, the wall from which the main post 21 extends.

The main post 21 is formed with a generally sqaure aperture 21*a* which is adapted to receive the finger 11*b* of latching member 11 of the brush replacement unit 5. The wall of the main post 21 formed with the aperture 21*a* defines, together with a wall 21*b* opposite thereto, a guide groove 21*c* for guiding the main wall 7 and the U-shaped latching member 11 mounted on the rear surface of the main wall 7.

The main post 21 in the brush holding mechanism 4 is formed at its lower end with a tapered portion 21*d* which is tapered away from the brush box 20 and whose function will be described later. Briefly described, this tapered portion 21*d* acts to actuate the brush locking element 13 when the brush replacement unit 5 is securely locked to the brush holding mechanism 4.

The brush replacement unit 5 is securely locked to the brush holding mechanism 4 by engagement of the finger 11*b* of the U-shaped latching member 11 with the aperture 21*a* of the main post 21 as a result of longitudinal movement of the main wall 7 and the associated U-shaped latching member 11 relative to the main post 21. The handle 10 is urged downward for causing the latching engagement of the finger 11*b* with the aperture 21*a*.

The brush replacement unit 5 can be locked to and unlocked from the brush holding mechanism 4 having the above construction by the steps which will be described presently.

The locking operation will firstly be described. A brush 8 is inserted into the brush retaining element 9 of the brush replacement unit 5. Prior to the insertion of the brush 8, the brush locking element 13 is released, that is, the L-shaped end of the rocking plate 13*a* is urged away from the brush retaining element 9. While maintaining that end of the rocking plate 13*a* in that position, the brush 8 is urged in a direction as shown by the arrow Q in FIG. 3 to be inserted into the brush retaining element 9 against the force of the coil spring 14. The brush locking element 13 may be maintained in the released position by the hand of the operator. However, from the viewpoints of work efficiency and safety, it is desirable to previously prepare a rod or the like and insert the rod between the main wall 7 and the rocking plate 13*a*.

Then, when the rod has been pulled out to restore the brush locking element 13 after full insertion of the brush 8, the L-shaped end of the rocking plate 13 engages with the bottom of the brush 8 to prevent drop-out of the brush 8. Since, in this case, the position of the block 19 is previously adjusted to ensure alignment of the axis of the brush 8 with the pressure imparting direction of the coil spring 14 as described hereinbefore, the brush 8 is properly pressed by the coil spring 14 against the L-shaped end of the rocking plate 13*a* while maintaining its predetermined attitude which is generally vertical to the slip ring 1.

Then, the terminal of the pig tail 8*a* of the brush 8 is secured to the predetermined portion of the main wall 7 by the machine screw 5. This establishes the state shown in FIG. 3.

The operator grasps the handle 10 of the brush replacement unit 5 assembled in the state shown in FIG. 3 and carries it to the predetermined position on the current collector part to mount it on the brush holding mechanism 4 shown in FIG. 6.

During mounting of the brush replacement unit 5 on the brush holding mechanism 4, the guide groove 21*c* formed in the main post 21 of the brush holding mechanism 4 acts as a guide so that the brush replacement unit 5 can be easily inserted in this portion of the brush holding mechanism 4.

With the insertion of the brush replacement unit 5 in the brush holding mechanism 4, the upper portion of one of the arms, including the manipulating lever 11*a*, of the U-shaped latching member 11 flexes by the spring action toward the other arm in the guide groove 21*c* of the main post 21. When the brush replacement unit 5 is fully inserted until the finger 11*b* of the U-shaped latching member 11 registers with the aperture 21*a* of the main post 21 of the brush holding mechanism 4, the finger 11*b* is engaged by the aperture 21*a* to lock the brush replacement unit 5 against upward movement as a result of restoration of the original shape of the latching member 11. Although this state of locking can be sufficiently sensed by the operator's hand grasping the handle 10 when the latching member 11 is designed to provide a strong spring action, it can also be visually confirmed from the positional relation between the manipulating lever 11*a* and the locking mark 17*b* provided on the upper surface of the protective insulating plate 17 as shown in FIG. 4. It will be seen in FIG. 4 that the position of the manipulating lever 11*a* is displaced from the range of the locking mark 17*b* to indicate that the brush replacement unit 5 is sufficiently locked to the brush holding mechanism 4. When, on the other hand, the brush replacement unit 5 is not fully inserted, the upper portion of the arm, including the manipulating lever 11*a*, of the U-shaped latching member 11 is flexed toward the other arm in the guide groove 21*a* of the main post 21 as described hereinbefore, and the manipulating lever 11*a* is located within the range of the locking mark 17*b* in such a case.

The upper finger 11*c* of the U-shaped latching member 11 acts as a stopper which engages with a seat 21*e* at the top of the main post 21 to prevent inadvertent excessive insertion of the brush replacement unit 5 into the brush holding mechanism 4.

Figure 7:
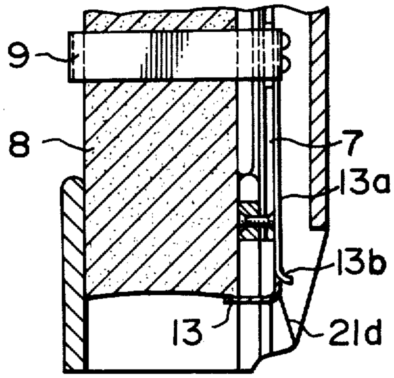
FIGS. 7 and 8 are sectional views showing the relation between the brush locking element in the brush replacement unit shown in FIG. 3 and the main post of the brush holding mechanism shown in FIG. 6.
Figure 8:
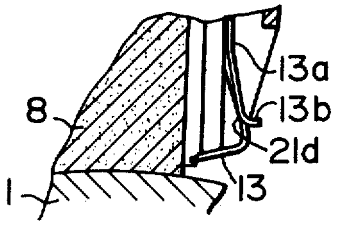

While the meanner of locking the brush replacement unit 5 to the brush holding mechanism 4 has been described, it is to be noted that the insertion of the brush replacement unit 5 into the brush holding mechanism 4 acts also to release the brush locking element 13 and to establish the path of current conduction. That is, as the main wall 7 of the brush replacement unit 5 is guided along the guide groove 21*c* of the main post 21 of the brush holding mechanism 4 until its lower end reaches a position as shown in FIG. 7, the engaging portion or finger 13*b* of the rocking plate 13 starts to engage with the tapered portion 21*d* formed at the lower end of the main post 21 of the brush holding mechanism 4, and finally, this tapered portion 21*d* acts to urge the L-shaped end of the rocking plate 13*a* away from the brush box 20. Consequently, the L-shaped end of the rocking plate 13*a* lying on the opposite side of the finger 13*b* is disengaged from the bottom of the brush 8 thereby unlocking the brush 8 as shown in FIG. 8. At this time, the current conductive knife 16 makes current conduction engagement with the socket 22. Thus, when the brush replacement unit 5 is completely locked to the brush holding mechanism 4, the electrical connection between the slip ring 1 and the stator part is also established. That state is shown in FIGS. 1 and 2.

Unlocking of the brush replacement unit 5 from the brush holding mechanism 4 will next be described.

The brush replacement unit 5 is unlocked or detached from the brush holding mechanism 4 when the brush 8 has been subjected to excessive wear or damage or when it is required to inspect, for example, the brush 8, the brush holding mechanism 4 itself and/or the brush replacement unit 5 itself.

Figure 4:
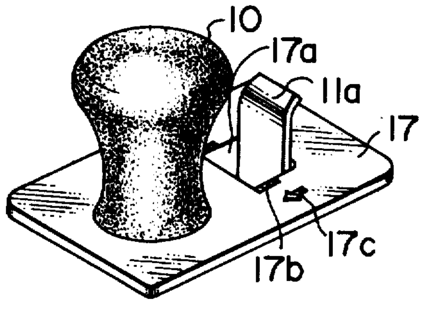
FIG. 4 is a perspective view showing the parts including the manipulating lever in the brush replacement unit shown in FIG. 3.
Figure 5:
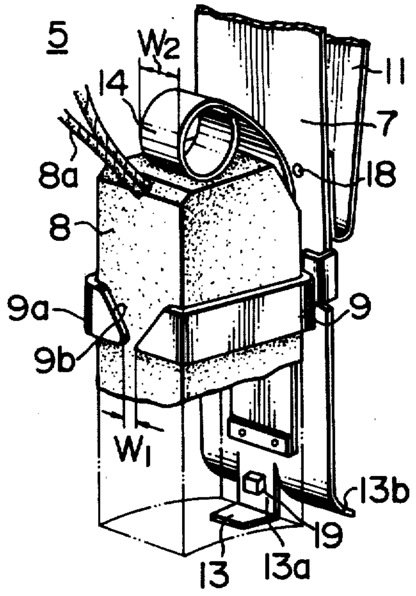
FIG. 5 is a perspective view of the parts including the brush retaining element in the brush replacement unit shown in FIG. 3.

In the first step, the operator grasps the handle 10 and the manipulating lever 11*a* in the brush replacement unit 5 and shifts the manipulating lever 11*a* in the direction of the arrow 17*c* or toward the handle 10 in FIG. 4. Then, when the operator pulls the brush replacement unit 5 upward while maintaining the manipulating lever 11*a* in the position lying within the range of the locking mark 17*b*, the brush replacement unit 5 is released from the locked position and can be removed from the brush holding mechanism 4. After the above manipulation or during removal of the brush replacement unit 5 from the brush holding mechanism 4, the engaging portion or finger 13*b* of the brush locking element 13 is disengaged from the tapered portion 21*d* of the main post 21 to be freed from any restriction, and the L-shaped end of the rocking plate 13*a* engages with and imparts holding pressure to a lower side wall portion of the brush 8. Thus, the brush 8 is frictionally maintained in position by the combination of the pressure imparting end of the rocking plate 13*a* and the wall surface of the brush retaining element 9 remote from the front surface of the main wall 7. Although such an action is not effective when the brush 8 is excessively worn and becomes short, its pig tail 8*a* is still connected to the main wall 7 of the brush replacement unit 5, so that the brush replacement unit 5 can be removed together with the brush 8 by the hand of the operator who pulls up the brush replacement unit 5 by grasping the handle 10. Therefore, in spite of the downward pressure imparted to the brush 8 by the coil spring 14, the brush 8 in the brush replacement unit 5 being carried by the operator can be maintained in position by the combination of the brush locking element 13 and the brush retaining element 9 which embraces the brush 8.

It will be understood from the foregoing detailed description of the present invention that a brush can be easily and simply replaced during operation of an electric rotary machine.

What we claim is:

1. A brush holding device for an electric rotary machine comprising a brush disposed to make sliding contact with the peripheral surface of a rotatable slip ring and having a pig tail extending from a portion thereof, and a brush holder releasably holding said brush while pressing said brush against the peripheral surface of said slip ring at a predetermined pressure, so that said brush can be removed from or installed in said brush holder at least during operation of the electric rotary machine, wherein said brush holder comprises a brush holding mechanism secured to a stationary part of the electric rotary machine and a brush replacement unit adapted to be locked to or unlocked from said brush holding mechanism together with said brush, said brush holding mechanism comprising a brush box secured to said stationary part for accommodating said brush therein so as to prevent the brush from being laterally displaced during operation of the rotary machine, a main post extending from a portion of said brush box, and an aperture formed in a portion of said main post to be engageable with a portion of said brush replacement unit, said brush replacement unit comprising a main wall, a brush spring anchored at one end thereof to a lower portion of said main wall, an insulated handle fixed to a top portion of said main wall, a resilient manipulating lever fixed at one end thereof to a portion of said main wall and protruding to terminate at the other end thereof on the same side as said handle, a latching member forming an integral part of said manipulating lever and having a finger engageable with said aperture of said main post in said brush holding mechanism, a brush locking element mounted on a lower portion of said main wall for engaging with said brush and locking said brush in position, and a brush retaining element in the form of a band loop supported on a portion of said main wall to loosely embrace a body portion of said brush, the brush retaining element being disposed on the main wall at a position such that the brush retaining element is located above an upper end of the brush box when the brush replacement unit is installed in the brush holding mechanism.

2. A brush holding device as claimed in claim 1, wherein said brush locking element includes a rocking plate fixed at one end thereof to a portion of said main wall and freely rockable at the other end thereof, said rockable end of said rocking plate including a portion bent in the form of an L to make locking engagement with the bottom of said brush and being arranged to be urged away from said brush by a portion of said brush holding mechanism.

3. A brush holding device as claimed in claim 1, wherein a cutout permitting passage of said pig tail of said brush therethrough is formed in a portion of said brush retaining element lying in a path of movement of said pig tail.

4. A brush holding device as claimed in claim 3, wherein said cutout is formed in one of walls constituting said brush retaining element remote from said main wall, and a narrowest portion of said cutout of said wall lying in the path of movement of said pig tail of said brush has a width smaller than a width of said brush spring.

5. A brush holding device as claimed in claim 3, wherein the width of said cutout of said brush retaining element is gradually narrowed from a side, through which said brush pig tail passes initially with gradual wear of said brush, toward a side through which said pig tail passes finally.

6. A brush holding device for an electric rotary machine comprising a brush disposed on a peripheral surface of a rotatable slip ring to make sliding contact therewith, and a brush holder releasably holding said brush while pressing said brush against the peripheral surface of said slip ring at a predetermined pressure so that said brush can be removed from or installed in said brush holder at least during operation of the electric rotary machine, wherein said brush holder comprises a brush holding mechanism secured to a stationary part of the electric rotary machine and a brush replacement unit adapted to be locked to or unlocked from said brush holding mechanism together with said brush, said brush holding mechanism comprising a brush box for accommodating said brush therein, a main post extending from a portion of said brush box, an aperture formed in a portion of said main post to be engageable with a portion of said brush replacement unit, a guide groove formed along said main post, and a current conductive socket mounted on the top of said main post and having an opening directed in the brush replacing direction of said brush replacement unit, said brush replacement unit comprising a main wall adapted to be received in said guide groove, a brush spring anchored at one end thereof to a lower portion of said main wall, an insulated handle fixed to the top portion of said main wall, a resilient manipulating lever fixed at one end thereof to a portion of said main wall and protruding to terminate at the other end thereof on the same side as said handle, a latching member forming an integral part of said manipulating lever and having a finger engageable with said aperature of said main post in said brush holding mechanism, a brush locking element mounted on a lower portion of said main wall for engaging with said brush and locking said brush in position, a current conductive knife fixed adjacent to the top portion of said main wall to be capable of insertion into said opening of said socket, and a brush retaining element in the form of a band supported on a portion of said main wall to embrace a bodyportion of said brush, the brush retaining unit disposed on the main wall at a position such that the brush retaining element is located above an upper end of the brush box when the brush replacement unit is installed in the brush holding mechanism.

7. A brush holding device as claimed in claim 6, wherein said brush locking element includes a rocking plate fixed at one end thereof to a portion of said main wall and freely rockable at the other end thereof, said rockable end of said rocking plate including a portion bent in the form of an L toward said brush box, said rocking plate including a finger extending from a portion adjacent to said rockable end of said rocking plate in a direction opposite to the direction of said L-shaped end portion and having such a tapered surface that the distance between it and said main wall increases toward said slip ring, and said brush box is formed on one of its walls with a tapered portion which engages with said finger of said rocking plate to urge said rocking plate away from said brush box when said brush replacement unit is inserted into said brush holding mechanism.

* * * * *